(12) United States Patent
Vald et al.

(10) Patent No.: US 11,343,069 B2
(45) Date of Patent: May 24, 2022

(54) ORACLE-AIDED PROTOCOL FOR COMPACT DATA STORAGE FOR APPLICATIONS USING COMPUTATIONS OVER FULLY HOMOMORPHIC ENCRYPTED DATA

(71) Applicant: Intuit Inc., Mountain View, CA (US)

(72) Inventors: Margarita Vald, Tel Aviv (IL); Laetitia Kahn, Tel Aviv (IL); Boaz Sapir, Tel Aviv (IL); Yaron Sheffer, Tel Aviv (IL); Yehezkel Shraga Resheff, Tel Aviv (IL)

(73) Assignee: Intuit Inc., Mountain View, CA (US)

( * ) Notice: Subject to any disclaimer, the term of this patent is extended or adjusted under 35 U.S.C. 154(b) by 135 days.

(21) Appl. No.: 16/783,471

(22) Filed: Feb. 6, 2020

(65) Prior Publication Data
US 2021/0250163 A1    Aug. 12, 2021

(51) Int. Cl.
  *H04K 1/00* (2006.01)
  *H04L 9/00* (2022.01)
  *H04L 9/28* (2006.01)
  *H04L 9/06* (2006.01)

(52) U.S. Cl.
  CPC ............ *H04L 9/008* (2013.01); *H04L 9/0631* (2013.01); *H04L 2209/08* (2013.01)

(58) Field of Classification Search
  CPC ..................................................... H04L 9/008
  USPC ......................................................... 380/28
  See application file for complete search history.

(56) References Cited

U.S. PATENT DOCUMENTS

| | | | |
|---|---|---|---|
| 2010/0091984 A1 | 4/2010 | Kerschbaum | |
| 2013/0247230 A1 | 9/2013 | Parann-Nissany | |
| 2015/0143111 A1 | 5/2015 | Parann-Nissany | |
| 2015/0270964 A1* | 9/2015 | Yasuda | H04L 9/0825 713/171 |
| 2015/0295712 A1* | 10/2015 | Veugen | H04L 63/0428 713/153 |
| 2019/0036678 A1* | 1/2019 | Ahmed | H04L 9/302 |

FOREIGN PATENT DOCUMENTS

| | | |
|---|---|---|
| EP | 2 043 015 | 4/2009 |
| WO | WO 2013/080204 | 6/2013 |

OTHER PUBLICATIONS

International Search Report dated Oct. 5, 2020 issued in International Application No. PCT/US2020/040395 filed Jul. 1, 2020.
Written Opinion dated Oc. 5, 2020 issued in International Application No. PCT/US2020/040395 filed Jul. 1, 2020.

* cited by examiner

*Primary Examiner* — Fatoumata Traore
*Assistant Examiner* — Samuel Ambaye
(74) *Attorney, Agent, or Firm* — DLA Piper LLP (US)

(57) ABSTRACT

Systems and methods that may implement an Oracle-aided protocol for producing and using FHE encrypted data. The systems and methods may initially encrypt and store input data in one encrypted form that is not performed using FHE, which does not substantially increase the size of the data and storage resources required to store the encrypted data. In accordance with the Oracle-aided protocol, the encrypted data is re-encrypted as FHE encrypted data when FHE encrypted data is required.

20 Claims, 5 Drawing Sheets

ORACLE-AIDED PROTOCOL FOR COMPACT DATA STORAGE FOR APPLICATIONS USING COMPUTATIONS OVER FULLY HOMOMORPHIC ENCRYPTED DATA

BACKGROUND

"Cloud computing" is on the rise. Cloud computing typically involves an enterprise using a third party's computing resources, such as e.g., its servers and or storage, to run an application on a set of data. One challenge to cloud computing is security—typically, the application is proprietary, the data is proprietary, or both are proprietary. Data breaches must be prevented to protect proprietary information and the algorithms used in the application.

Encryption may be used to protect the data. Under traditional mechanisms, for example, the data may be encrypted at a point of origin and then transported across a network as ciphertext. This encrypted data, however, must be decrypted at the point of destination for it to be processed. Once the data is decrypted, it is exposed to parties at the destination where the data is being processed. If the data represents private or sensitive information, then additional security measures may need to be taken to ensure that the data is not released to unauthorized parties.

It is known in the art that fully homomorphic encryption (FHE) is a type of encryption that allows computations to be performed on encrypted data. When computations are performed on the FHE encrypted data, the output is an encrypted version of the computations' results. When these results are subsequently decrypted, the results match the results of the computations as if they had been performed on the original un-encrypted data (i.e., plaintext). Thus, FHE can be used for privacy-preserving outsourced storage of data and cloud-based computations of that data. For example, this allows the data to remain encrypted and out-sourced over a cloud-based environment for processing. This also allows the underlying computations to remain hidden from the source of the data as well.

A downside of FHE, however, is that it introduces a significant increase in data size and therefore an increase in memory storage resources (e.g., long term memory storage). For example, it is estimated that there is about a 1000-times increase/blow-up from the size of the unencrypted data to the size of the FHE encrypted data, where the exact increase factor depends on the FHE schema being used. Thus, substantially increased memory/storage resources are used when performing FHE. In addition, the increased data size may be impractical for analytics data such as the data existing in large data lakes (i.e., a storage repository that holds a vast amount of raw data in its native format until it is needed). Accordingly, there is a need and desire to reduce the data size and hence memory storage for systems and methods performing fully homomorphic encryption.

DETAILED DESCRIPTION OF SEVERAL EMBODIMENTS

Embodiments described herein may be configured to implement an Oracle-aided protocol for producing and using FHE encrypted data. In one or more embodiments, the disclosed principles may initially encrypt and store input data in one encrypted form that is not performed using FHE and which does not substantially increase the size of the data and storage resources required to store the encrypted data. In accordance with the disclosed Oracle-aided protocol, the encrypted data is re-encrypted as FHE encrypted data when a fully homomorphic encryption (FHE) process is required.

For example, the embodiments disclosed herein may symmetrically encrypt (e.g., via the advanced encryption standard or "AES") the data for long-term storage and only convert it into FHE encrypted data when FHE data is required. In one embodiment, a privacy-preserving auxiliary server (referred to herein as an "Oracle") may be used to assist with re-encrypting (e.g., via FHE) the initially AES encrypted data with a guarantee that the server does not learn the contents of the raw data. In one embodiment, privacy may be ensured by blinding the data before it is initially encrypted and stored.

An example computer-implemented method comprises, at a data originator computing device: inputting unencrypted input data intended to be processed by a computation computing device using a fully homomorphic encryption (FHE) computation process, performing an operation on the unencrypted input data to create a blinded input value and auxiliary data, encrypting the blinded input value and auxiliary data, and storing the encrypted blinded input value and encrypted auxiliary data in a storage medium accessible to the computation computing device and an auxiliary computing device. The method further comprises at the auxiliary computing device: privacy-preserving re-encrypting the encrypted auxiliary data using fully homomorphic encryption to create FHE encrypted auxiliary data.

In one or more embodiments, the computer-implemented method further comprises: at the auxiliary computing device: transmitting the FHE encrypted auxiliary data to the computation computing device; and at the computation computing device: receiving the FHE encrypted auxiliary data, privacy-preserving re-encrypting the encrypted blinded input value using fully homomorphic encryption to create an FHE encrypted blinded input value, and combining the FHE encrypted auxiliary data and the FHE encrypted blinded input value to create an FHE encrypted input.

Figure 1:
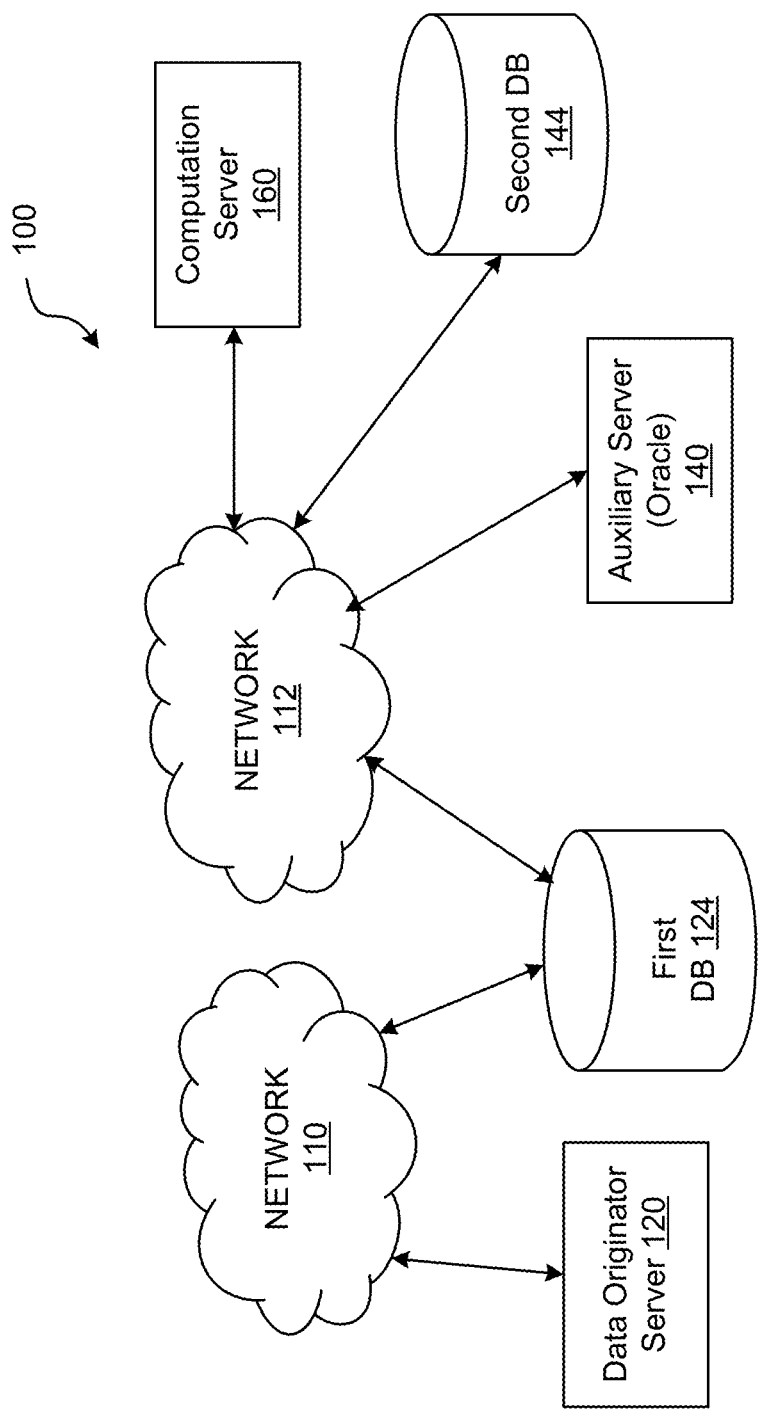
FIG. 1 shows an example of a system configured to provide an Oracle-aided protocol for producing and using FHE encrypted data in accordance with an embodiment of the present disclosure.

FIG. 1 shows an example of a system 100 configured to provide an Oracle-aided protocol for producing and using FHE encrypted data according to an embodiment of the present disclosure. System 100 may include a data originator server 120, auxiliary server 140 (i.e., the Oracle), and a computation server 160. The data originator server 120, auxiliary server 140 andr computation server 160 may be configured to communicate with one another through one or more networks 110, 112. For example, communication between the elements may be facilitated by one or more application programming interfaces (APIs). APIs of system 100 may be proprietary and/or may be custom APIs based on the REST principles or other underlying mechanisms, such as GOOGLE's gRPC or the like. Networks 110, 112 may be the Internet and/or other public or private networks or combinations thereof.

The data originator server 120 may be configured to run an application and receive input data via e.g., network 110. The input data may be required to be stored in e.g., a data lake, which may reside in one or more databases 124, 144, or other memory under the control of the data originator server 120, auxiliary server 140 (i.e., the Oracle), or computation server 160.

In one embodiment, the input data may require encrypted processing by the computation server 160 or another server using e.g., fully homomorphic encryption processing to ensure the privacy of the data. As noted above, one feature of the disclosed principles is to reduce the data size and storage requirements typically needed to perform computations over FHE encrypted data. Thus, in accordance with the disclosed principles, and as described in more detail below, it is desired to encrypt the data by an encryption method (e.g., via AES) that does not use FHE for long-term storage (e.g., in one or more databases 124, 144) and only convert it into FHE encrypted data when the computations over FHE data is required (e.g., by computation server 160). Detailed examples of the data gathered, processing performed, and the results generated are provided below.

The data originator server 120, auxiliary server 140, computation server 160, first database 124, and second database 144 are each depicted as single devices for ease of illustration, but those of ordinary skill in the art will appreciate that the data originator server 120, auxiliary server 140, computation server 160, first database 124, and/or second database 144 may be embodied in different forms for different implementations. For example, any or each of data originator server 120, auxiliary server 140, and computation server 160 may include a plurality of servers or one or more of the first database 124 and second database 144. Alternatively, the operations performed by any or each of data originator server 120, auxiliary server 140, and computation server 160 may be performed on fewer (e.g., one or two) servers.

Figure 2:
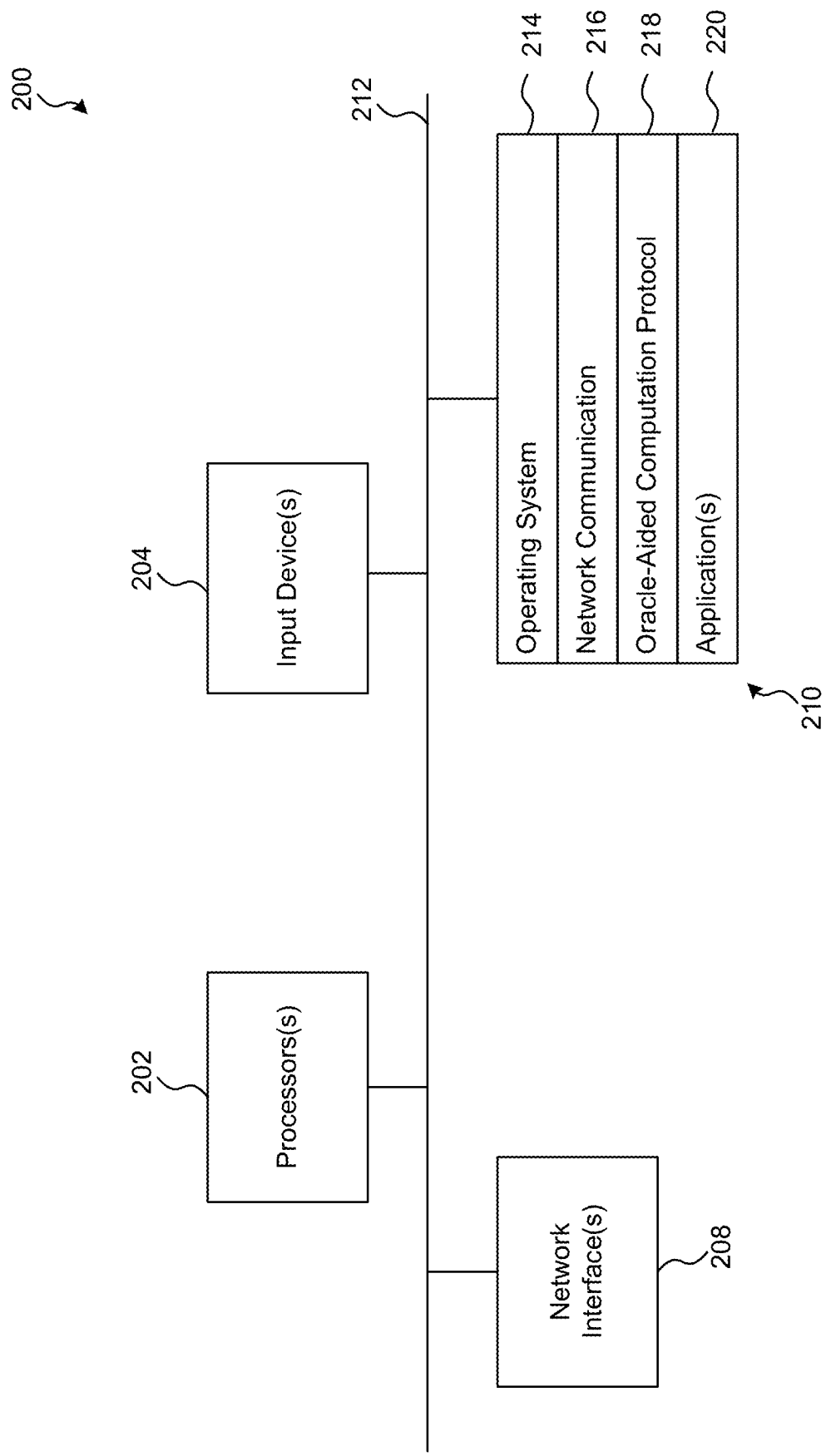
FIG. 2 shows a server device according to an embodiment of the present disclosure.

FIG. 2 is a block diagram of an example computing device 200 that may implement various features and processes as described herein. For example, computing device 200 may function as data originator server 120, auxiliary server 140, or computation server 160. The computing device 200 may be implemented on any electronic device that runs software applications derived from compiled instructions, including without limitation personal computers, servers, smart phones, media players, electronic tablets, game consoles, email devices, etc. In some implementations, the computing device 200 may include one or more processors 202, one or more input devices 204, one or more network interfaces 208, and one or more non-transitory computer-readable media 210. Each of these components may be coupled by a bus 212.

Processor(s) 202 may use any known processor technology, including but not limited to graphics processors and multi-core processors. Input device 204 may be any known input device technology, including but not limited to a keyboard (including a virtual keyboard), mouse, track ball, and touch-sensitive pad or display. Bus 212 may be any known internal or external bus technology, including but not limited to ISA, EISA, PCI, PCI Express, USB, Serial ATA or FireWire. Computer-readable medium 210 may be any medium that participates in providing instructions to processor(s) 202 for execution, including without limitation, non-volatile storage media (e.g., optical disks, magnetic disks, flash drives, etc.), or volatile media (e.g., SDRAM, ROM, etc.).

Computer-readable medium 210 may include various instructions 214 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 204; sending output to display device 206; keeping track of files and directories on non-transitory computer-readable medium 210; controlling peripheral devices (e.g., disk drives, printers, etc.) which can be controlled directly or through an I/O controller; and managing traffic on bus 212. Network communications instructions 216 may establish and maintain network connections (e.g., software for implementing communication protocols, such as TCP/IP, HTTP, Ethernet, telephony, etc.).

Oracle-aided protocol instructions 218 may include instructions that implement an Oracle-aided protocol for producing and using FHE encrypted data as described herein. Application(s) 220 may be an application that uses or implements the processes described herein and/or other processes. The processes may also be implemented in operating system 214.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 3A:
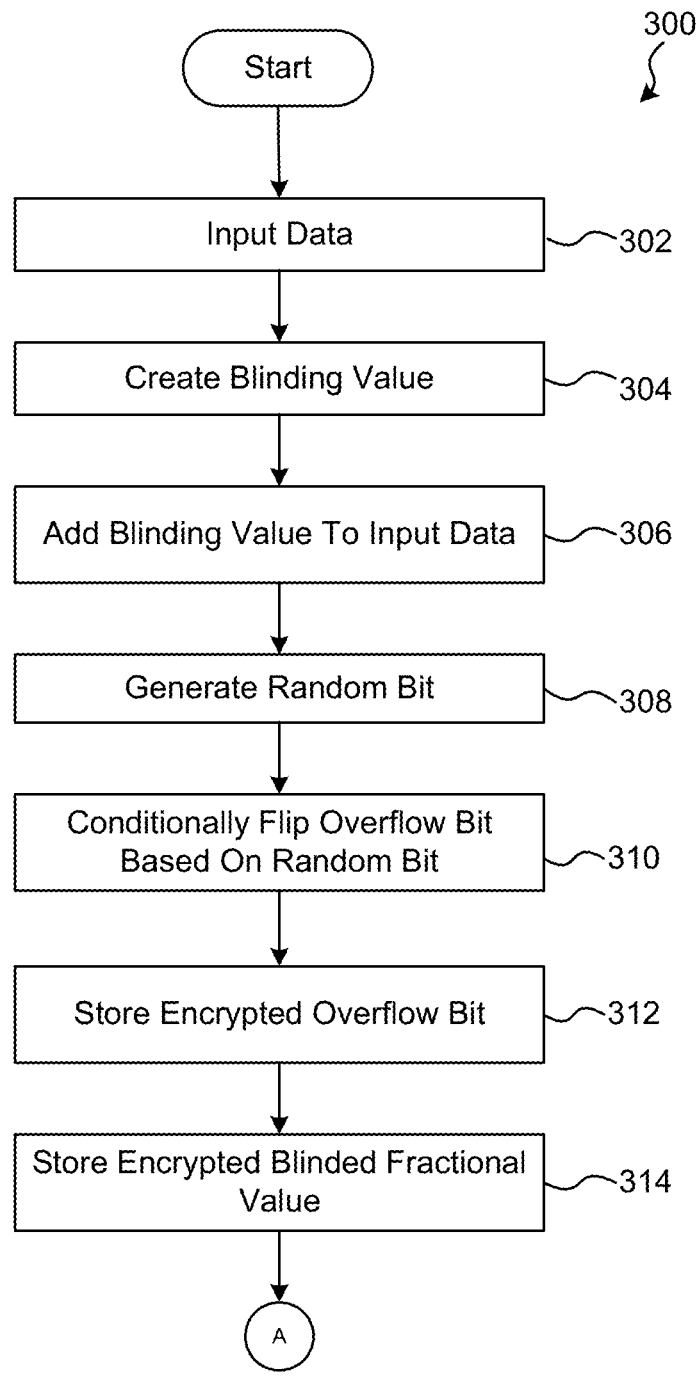
FIGS. 3A-3C show an example process according to an embodiment of the present disclosure.
Figure 3B:
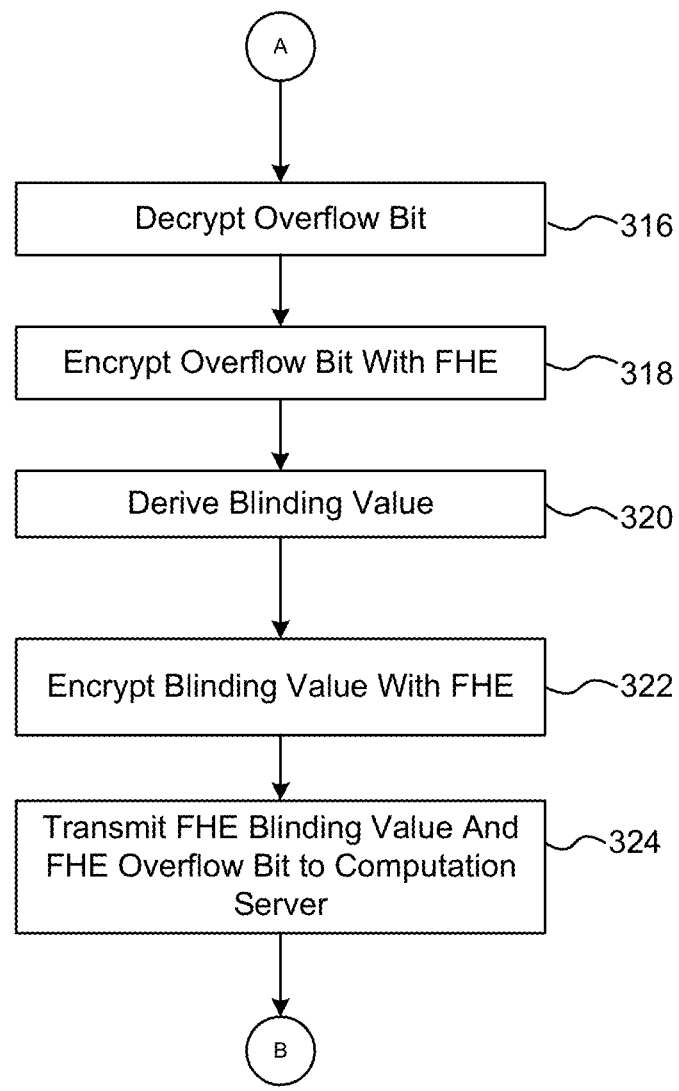
Figure 3C:
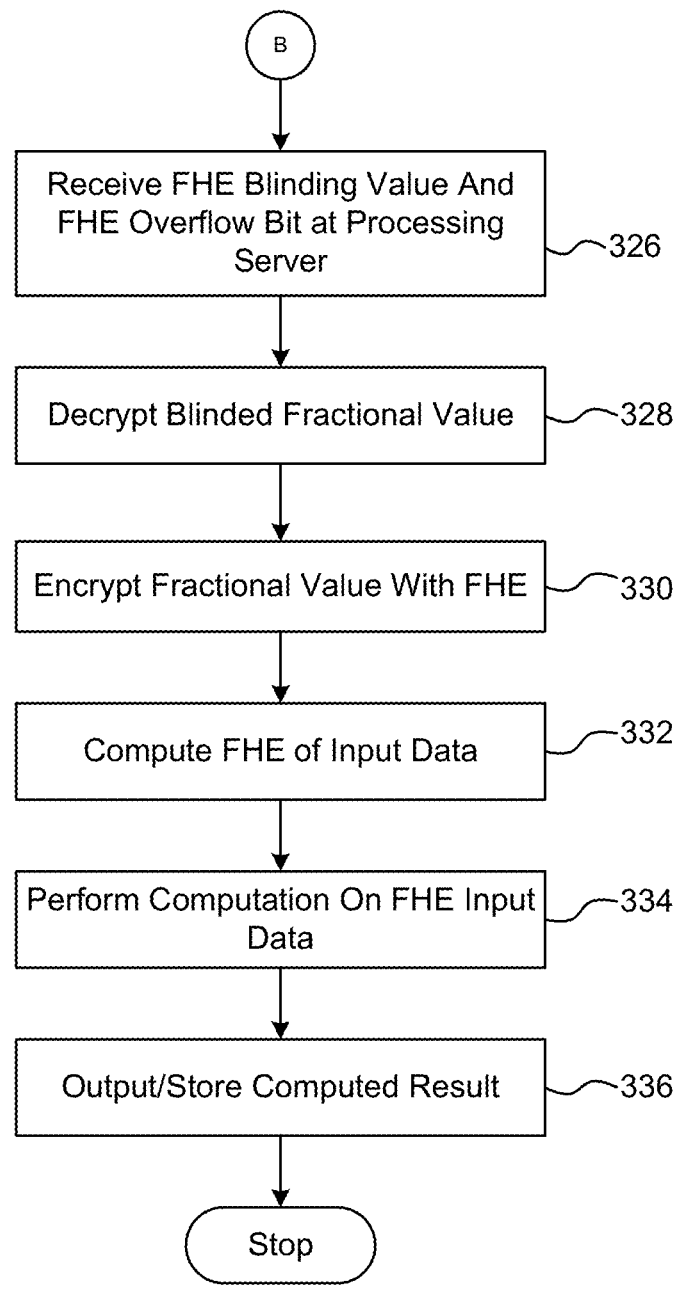

FIGS. 3A-3C illustrate an example Oracle-aided protocol process 300 in accordance with the disclosed principles. In one embodiment, system 100 may perform some or all of the processing illustrated in FIGS. 3A-3C. For example, data originator server 120 may run an application that may input data requiring further processing by an application or other program running on another device, referred to herein as the computation server 160. In one embodiment, to ensure that the computation server 160, which may be an untrusted server, does not learn the value of the input data, while also ensuring that the data size and storage requirements are not substantially increased, the input data is initially symmetrically encrypted without using an FHE process for long-term storage and only converted into FHE encrypted data when FHE processing is required and performed by the computation server 160. In one embodiment, a privacy-preserving server, auxiliary server 140 (also referred to herein as the "Oracle") may be used to assist with re-encrypting (e.g., via FHE) the initially encrypted data as discussed herein. During the process 300, the input data in its encrypted and or unencrypted form may be stored in one or more of the databases 124, 144 in accordance with the disclosed principles.

At step 302, the process 300 inputs the data to be subsequently processed. The data may have an input value x between 0 and 1. That is, $x \in \{0, 1\}$. This value is known in cleartext to the application, but should not be known to either the Oracle (i.e., auxiliary server 140) or the computation server 160 to preserve the privacy of the input data. This is the value that may be homomorphically encrypted near the end of the process 300 so that the computation server 160 may run FHE computations on it.

In the illustrated example, at step 304 the process 300 (e.g., via the application running on the data originator server 120) uses a cryptographic key $K_t$ (referred to herein as the "blinding value encryption key") to create a deterministic blinding value t also having a value between 0 and 1 (i.e., $t \in \{0, 1\}$). The blinding value may be a random real value in [0, 1]. If the data is single-precision floating point data, twenty-four bits of randomness may be sufficient. For double precision data, fifty-three bits may be used at this step.

At step 306, the blinding value is added to the input value to form a blinded input y (e.g., y=x+t). The blinded input may have a blinded fractional value $y_{frac}$ and an overflow bit $y_{int}$. The overflow bit may be referred to herein as "auxiliary data." In one embodiment, $y_{int} = \lfloor y \rfloor$ and $y_{frac} = y - y_{int}$. It should be appreciated that $y_{int} \in \{0, 1\}$.

At step 308, the process 300 (e.g., via the application running on the data originator server 120) generates a random value, which may be a bit, b (e.g., $b \in_R \{0, 1\}$). Depending on the value of the random bit, the overflow bit $y_{int}$ may be conditionally flipped at step 310 (represented as $y'_{int}$). In the illustrated example, the overflow bit is not flipped when the random bit is zero, but is flipped when the random bit is not zero. This is shown below:

$$y'_{int} = \begin{cases} y_{int} & b = 0 \\ 1 - y_{int} & \text{otherwise} \end{cases}$$

At step 312, the application may encrypt the possibly-flipped overflow bit $y'_{int}$, with AES using e.g., an overflow bit encryption key $k_{int}$ (e.g., $c_{int} = \text{Enc}(K_{int}, y'_{int})$). The encrypted bit $c_{int}$ may then be stored. The overflow bit encryption key $k_{int}$ may be generated and controlled by the application running on the data originator server 120 and may be available to the Oracle (e.g., auxiliary server 140), but not the computation server 160. To optimize storage, in one embodiment, the possibly-flipped overflow bit $y'_{int}$ may be encrypted with a stream encryption method (e.g., AES-CTR) and the result stored as a new element in the ciphertext header. In one embodiment, this step and the step for deriving the blinding value (t), the disclosed principles could use nonces (e.g., file name, index within the file, etc.) to increase randomness.

At step 314, the process 300 (e.g., via the application running on the data originator server 120) may store an encrypted version of the blinded fractional value created at step 306. In one embodiment, before being stored, the blinded fractional value is added with the random bit (e.g., $y_{new} = b + y_{frac}$) and then encrypted using an AES encryption technique using as e.g., a data encryption key $K_{data}$ (e.g., $c_{new} = \text{Enc}(K_{data}, y_{new})$). The encrypted value $c_{new}$ may then be stored at this point. The data encryption key $k_{data}$ may be generated and controlled by the application running on the data originator server 120 and may be available to the computation server 160, but not the Oracle (i.e., auxiliary server 140).

When the fully homomorphic computation needs to take place, the process 300 continues at step 316, where the Oracle (i.e., auxiliary server 140) decrypts the overflow bit using the overflow bit encryption key $K_{int}$. That is, the overflow bit encryption key $K_{int}$ may be fetched from memory and used to decrypt $c_{int}$ (i.e., decrypted overflow bit) and obtain the conditionally-flipped overflow bit $y'_{int}$. At step 318, the conditionally-flipped overflow bit $y'_{int}$ is encrypted homomorphically (e.g., $\bar{y}'_{int}$=FHE($y'_{int}$)). That is, the overflow bit is re-encrypted to be an FHE encrypted overflow bit, i.e., a real value equal to 0 or to 1 which is encrypted with FHE.

At step 320, the Oracle may generate the blinding value t from the blinding value encryption key $K_t$. In one embodiment, step 320 performs the same processing performed at step 304 (discussed above). At step 322, the blinding value t may be encrypted homomorphically (e.g., $\bar{t}$=FHE(t)). The two homomorphically encrypted values $\bar{y}'_{int}$, $\bar{t}$ are sent to the computation server 160 at step 324. It should be appreciated that the Oracle (i.e., auxiliary server 140) does not see the encrypted fractional value and therefore has no information about the input value. As such, privacy of the input data is ensured even though the Oracle is performing steps in the process 300.

At step 326, the computation server 160 receives the homomorphically encrypted overflow bit $\bar{y}'_{int}$ and the homomorphically encrypted blinding value $\bar{t}$ from the Oracle. At step 328, the blinded fractional value is decrypted. For example, the computation server 160 may fetch the data encryption key $K_{data}$ from memory and decrypt $c_{new}$ to obtain the blinded fractional $y_{new}$ (i.e., decrypted blinded fractional value). At step 330, the blinded fractional value $y_{new}$ may be encrypted homomorphically (e.g., $\bar{y}_{new}$=FHE($y_{new}$)). That is, the blinded fractional value is re-encrypted to be an FHE encrypted blinded fractional value.

At step 332, the FHE encrypted input value $\bar{x}$ may be computed from the homomorphically encrypted blinded fractional value $\bar{y}_{new}$ and the homomorphically encrypted overflow bit. For example, a homomorphically encrypted fractional value $\bar{y}$ may be determined as follows:

$$\bar{y} = \begin{cases} \bar{y}_{new} + \bar{y}_{int} & y_{new} = 1 \\ \bar{y}_{new} + \bar{y}'_{int} & \text{otherwise} \end{cases}$$

The FHE encrypted input data $\bar{x}$ may be determined by subtracting the homomorphically encrypted blinding value $\bar{t}$ from the homomorphically encrypted fractional value $\bar{y}$. That is, $\bar{x}=\bar{y}-\bar{t}$. At step 334, further homomorphic computations may be performed using the FHE encrypted input data $\bar{x}$ and the computed results may be output from, and or stored by, the computation server 160, if desired.

There are theoretical proposals in the pertinent literature to encrypt data with stream encryption before re-encrypting it on the fly into FHE encrypted data. This technique, however, needs to be done on a per bit basis, which would dramatically increase the number of local operations performed, and the needed processing and storage resources to FHE encrypt each bit. Moreover, the application using the data would need to operate on a per-bit basis as well, meaning that it would need to be reconfigured. These results are undesirable and would not perform as well as the principles disclosed herein. The technique described herein is appropriate and efficient for FHE systems that operate directly on real-valued (i.e., floating point) data.

As can be appreciated, the combination of fully homomorphic encryption (FHE) and a simple Oracle-aided protocol that uses blinding in accordance with the disclosed principles substantially reduces the amount of storage required to perform the fully homomorphic encryption operations on input data that was initially not FHE encrypted. Specifically, the disclosed principles prevent the 1000-times increase/blow-up of data size and storage resources, yet allows FHE computations to be performed. This is a major improvement in the technological art as it improves the functioning of a computerized system, uses compact storage for a data lake and is an improvement to the technology and technical field of fully homomorphic encryption and data security for cloud-computing and cloud-based environments.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer implemented method comprising:
   at a data originator computing device:
      inputting unencrypted input data intended to be processed by a computation computing device using a fully homomorphic encryption (FHE) computation process,
      performing an operation on the unencrypted input data to create a blinded input value and auxiliary data,
      encrypting the blinded input value and auxiliary data, and
      storing the encrypted blinded input value and encrypted auxiliary data in a storage medium accessible to the computation computing device and an auxiliary computing device;
   at the auxiliary computing device:
      privacy-preserving re-encrypting the encrypted auxiliary data using fully homomorphic encryption to create FHE encrypted auxiliary data; and
      transmitting the FHE encrypted auxiliary data to the computation computing device; and
   at the computation computing device:
      re-encrypting the encrypted blinded input value using fully homomorphic encryption to create an FHE encrypted blinded input value.

2. The method of claim 1, further comprising:
   at the computation computing device:
      combining the FHE encrypted auxiliary data and the FHE encrypted blinded input value to create an FHE encrypted input.

3. The method of claim 2, wherein performing an operation on the unencrypted input data to create the blinded input value and auxiliary data comprises adding a blinding value to the input data.

4. The method of claim 2, wherein the blinded input value comprises a blinded fractional value and the auxiliary data comprises an overflow bit, encrypting the blinded input value comprises encrypting the blinded fractional value using a first encryption key, and encrypting the auxiliary data comprises encrypting the overflow bit using a second encryption key.

5. The method of claim 4, further comprising, at the data originator computing device:
generating a random value; and
flipping the overflow bit based on the random value before encrypting the overflow bit using the second encryption key,
wherein encrypting the blinded input value further comprises adding the random value to the blinded fractional value before encrypting the blinded fractional value using the first encryption key.

6. The method of claim 5, wherein re-encrypting the encrypted auxiliary data using fully homomorphic encryption to create FHE encrypted auxiliary data comprises:
decrypting the encrypted overflow bit using the second encryption key; and
encrypting the decrypted overflow bit using fully homomorphic encryption.

7. The method of claim 6, wherein re-encrypting the encrypted blinded input value using fully homomorphic encryption to create the FHE encrypted blinded input value comprises:
decrypting the encrypted blinded fractional value using the first encryption key; and
encrypting the decrypted blinded fractional value using fully homomorphic encryption.

8. The method of claim 6, wherein combining the FHE encrypted auxiliary data and the FHE encrypted blinded input value to create the FHE encrypted input comprises:
adding the FHE encrypted blinded fractional value to the FHE encrypted overflow bit when the random value has a first value,
subtracting the FHE encrypted blinded fractional value from the FHE encrypted overflow bit when the random value has a second value, and
subtracting a blinding value used to create the blinded input value.

9. The method of claim 1 further comprising, at the computation computing device, performing a FHE computation process on the FHE encrypted input.

10. A system comprising:
a data originator computing device configured to:
input unencrypted input data intended to be processed by a computation computing device using a fully homomorphic encryption (FHE) computation process,
perform an operation on the unencrypted input data to create a blinded input value and auxiliary data,
encrypt the blinded input value and auxiliary data, and
store the encrypted blinded input value and encrypted auxiliary data in a storage medium accessible to the computation computing device and an auxiliary computing device;
the auxiliary computing device being configured to:
privacy-preserving re-encrypt the encrypted auxiliary data using fully homomorphic encryption to create FHE encrypted auxiliary data; and
transmit the FHE encrypted auxiliary data to the computation computing device; and
the computation computing device being configured to:
re-encrypt the encrypted blinded input value using fully homomorphic encryption to create an FHE encrypted blinded input value.

11. The system of claim 10, further comprising:
the computation computing device being further configured to:
combine the FHE encrypted auxiliary data and the FHE encrypted blinded input value to create an FHE encrypted input.

12. The system of claim 11, wherein performing an operation on the unencrypted input data to create the blinded input value and auxiliary data comprises adding a blinding value to the input data.

13. The system of claim 11, wherein the blinded input value comprises a blinded fractional value and the auxiliary data comprises an overflow bit, encrypting the blinded input value comprises encrypting the blinded fractional value using a first encryption key, and encrypting the auxiliary data comprises encrypting the overflow bit using a second encryption key.

14. The system of claim 13, wherein the data originator computing device is further configured to:
generate a random value; and
flip the overflow bit based on the random value before encrypting the overflow bit using the second encryption key,
wherein encrypting the blinded input value further comprises adding the random value to the blinded fractional value before encrypting the blinded fractional value using the first encryption key.

15. The system of claim 14, wherein re-encrypting the encrypted auxiliary data using fully homomorphic encryption to create FHE encrypted auxiliary data comprises:
decrypting the encrypted overflow bit using the second encryption key; and
encrypting the decrypted overflow bit using fully homomorphic encryption.

16. The system of claim 15, wherein re-encrypting the encrypted blinded input value using fully homomorphic encryption to create the FHE encrypted blinded input value comprises:
decrypting the encrypted blinded fractional value using the first encryption key; and
encrypting the decrypted blinded fractional value using fully homomorphic encryption.

17. The system of claim 15, wherein combining the FHE encrypted auxiliary data and the FHE encrypted blinded input value to create the FHE encrypted input comprises:
adding the FHE encrypted blinded fractional value to the FHE encrypted overflow bit when the random value has a first value,
subtracting the FHE encrypted blinded fractional value from the FHE encrypted overflow bit when the random value has a second value, and
subtracting a blinding value used to create the blinded input value.

18. A computer implemented method comprising:
at a data originator computing device:
inputting unencrypted input data intended to be processed by a computation computing device using a fully homomorphic encryption (FHE) computation process,
performing an operation on the unencrypted input data to create a blinded input value and auxiliary data, encrypting the blinded input value and auxiliary data, and storing the encrypted blinded input value and encrypted auxiliary data in a storage medium accessible to the computation computing device and an auxiliary computing device; and at the auxiliary computing device:

performing an operation on the encrypted auxiliary data, re-encrypting the encrypted auxiliary data using fully homomorphic encryption to create FHE encrypted auxiliary data, and transmitting the FHE encrypted auxiliary data to the computation computing device; and at the computation computing device:

receiving the FHE encrypted auxiliary data, re-encrypting the encrypted blinded input value using fully homomorphic encryption to create an FHE encrypted blinded input value, and combining the FHE encrypted auxiliary data and the FHE encrypted blinded input value to create an FHE encrypted input.

19. The method of claim 18, wherein performing an operation on the unencrypted input data to create the blinded input value and auxiliary data comprises adding a blinding value to the input data.

20. The method of claim 18, wherein the blinded input value comprises a blinded fractional value and the auxiliary data comprises an overflow bit, encrypting the blinded input value comprises encrypting the blinded fractional value using a first encryption key, and encrypting the auxiliary data comprises encrypting the overflow bit using a second encryption key.

* * * * *